US 12,019,085 B2
(45) Date of Patent: Jun. 25, 2024

(12) United States Patent
Enta et al.

(54) AUTOMATIC ANALYSIS DEVICE AND AUTOMATIC ANALYSIS SYSTEM

(71) Applicant: Hitachi High-Tech Corporation, Tokyo (JP)

(72) Inventors: Kunio Enta, Tokyo (JP); Masashi Akutsu, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 538 days.

(21) Appl. No.: 17/265,600

(22) PCT Filed: May 28, 2019

(86) PCT No.: PCT/JP2019/021040
§ 371 (c)(1),
(2) Date: Feb. 3, 2021

(87) PCT Pub. No.: WO2020/039679
PCT Pub. Date: Feb. 27, 2020

(65) Prior Publication Data
US 2021/0302451 A1 Sep. 30, 2021

(30) Foreign Application Priority Data
Aug. 22, 2018 (JP) .................... 2018-155400

(51) Int. Cl.
G01N 35/00 (2006.01)
G01N 35/02 (2006.01)
G01N 35/10 (2006.01)

(52) U.S. Cl.
CPC ..... *G01N 35/00732* (2013.01); *G01N 35/025* (2013.01); *G01N 35/1002* (2013.01);
(Continued)

(58) Field of Classification Search
CPC ........... G01N 35/00732; G01N 35/025; G01N 35/1002; G01N 2035/00752; G01N 2035/0094; G01N 35/0092
See application file for complete search history.

(56) References Cited

U.S. PATENT DOCUMENTS
2004/0096361 A1    5/2004 Matsubara et al.

FOREIGN PATENT DOCUMENTS
JP    S6352063 A      3/1988
JP    H11258248 A  *  9/1999
(Continued)

OTHER PUBLICATIONS
Search Report dated Aug. 27, 2019 in corresponding International Application No. PCT/JP2019/021040.
(Continued)

*Primary Examiner* — Jill A Warden
*Assistant Examiner* — John McGuirk
(74) *Attorney, Agent, or Firm* — Miles & Stockbridge, P.C.

(57) ABSTRACT

An automatic analysis device and an automatic analysis system capable of executing separate operations by respective analysis units even in a device configuration where a same control part controls two or more analysis units, the automatic analysis device including a biochemistry analysis unit; an electrolyte analysis unit; one analysis unit control CPU for controlling operations of the biochemistry analysis unit and the electrolyte analysis unit; and a storage part for storing time charts of operations having different purposes for the biochemistry analysis unit and the electrolyte analysis units. Two or more of the biochemistry analysis units and the electrolyte analysis units operate independently to each other based on the time charts stored in the storage part.

8 Claims, 4 Drawing Sheets

(52) U.S. Cl.
CPC .............. *G01N 2035/00752* (2013.01); *G01N 35/0092* (2013.01)

(56) References Cited

FOREIGN PATENT DOCUMENTS

| JP | H11258248 A | | 9/1999 |
|---|---|---|---|
| JP | 2008051620 A | | 3/2008 |
| JP | 200936723 A | | 2/2009 |
| JP | 2009036723 A | * | 2/2009 |
| JP | 2010164432 A | | 7/2010 |
| JP | 2010223818 A | | 10/2010 |
| JP | 201133409 A | | 2/2011 |

OTHER PUBLICATIONS

Written Opinion dated Aug. 27, 2019 in corresponding International Application No. PCT/JP2019/021040.
International Preliminary Report on Patentablity dated Jan. 22, 2020 in corresponding International Application No. PCT/JP2019/021040.
Search Report dated May 23, 2022 in European Application No. 19852051.2.
International Preliminary Report on Patentablity dated Feb. 25, 2021 in corresponding International Application No. PCT/JP2019/021040.

* cited by examiner

[FIG. 1]
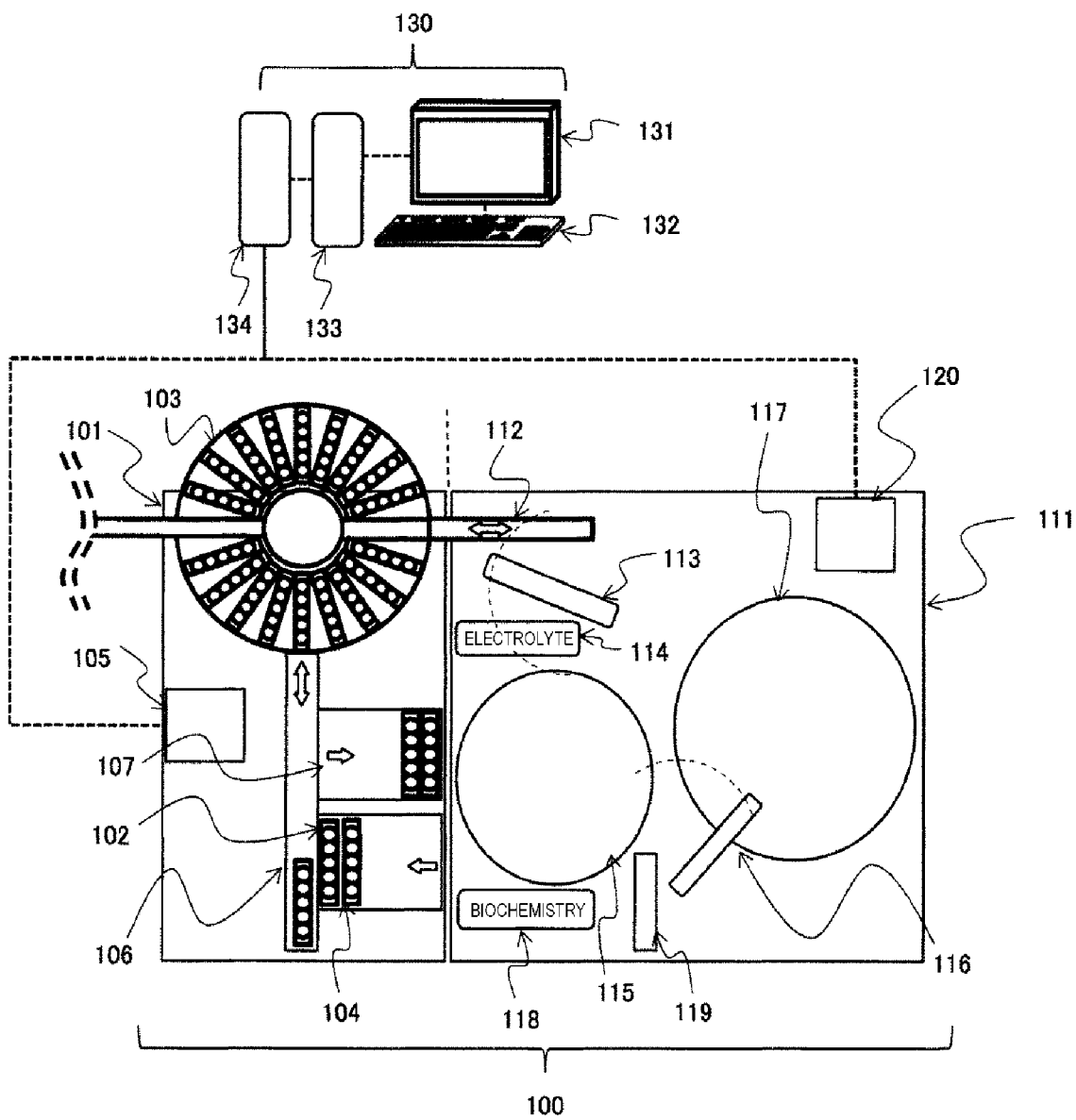

[FIG. 2]
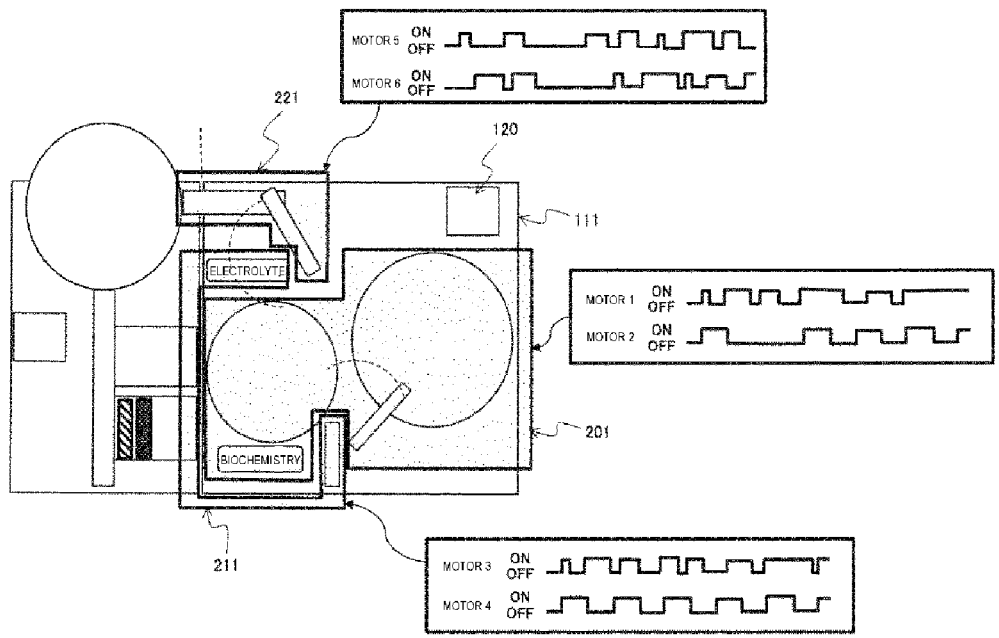
[FIG. 3]
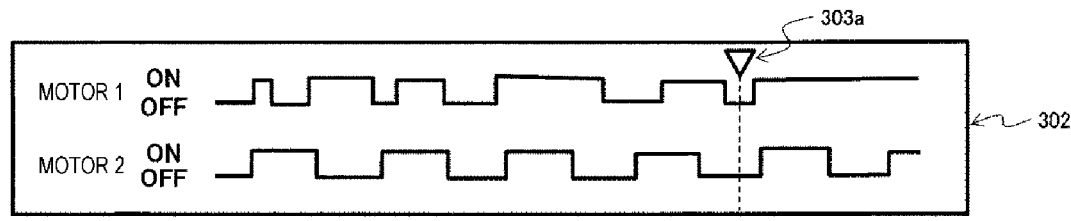
[FIG. 4]
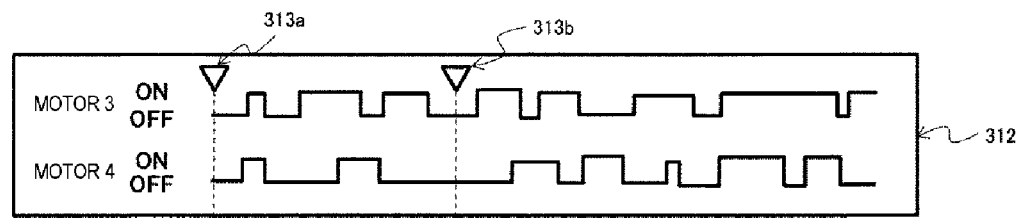
[FIG. 5]
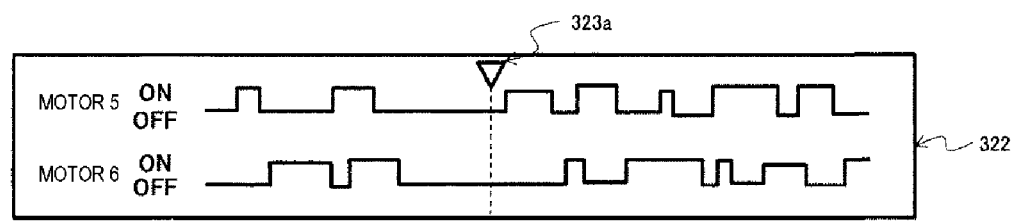

[FIG. 6]

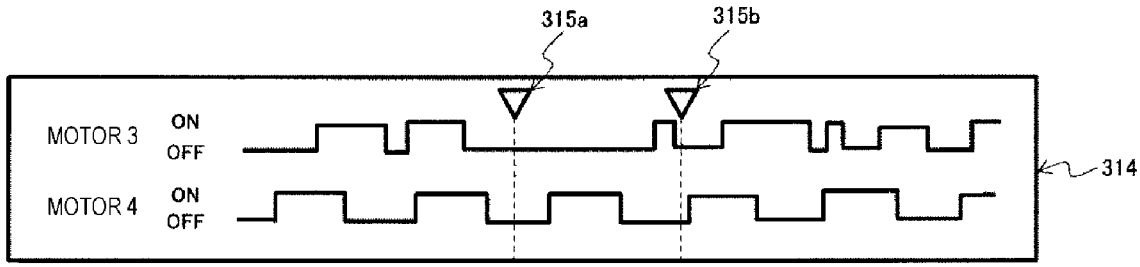

[FIG. 7]

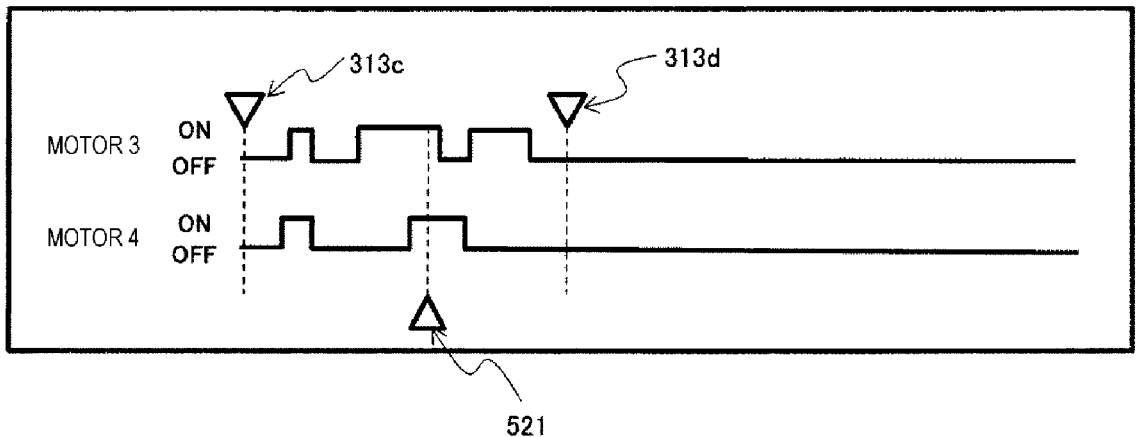

[FIG. 8]

| OPERATION ITEMS | BIOCHEMISTRY ANALYSIS UNIT | ELECTROLYTE ANALYSIS UNIT | COMMON UNIT | |
|---|---|---|---|---|
| Reset | OPERATION ○ | OPERATION ○ | OPERATION ○ | 611 |
| Cell Blank | OPERATION ○ | OPERATION × | OPERATION × | |
| REAGENT PRIME | OPERATION × | OPERATION ○ | OPERATION × | 612 |
| : | : | : | : | |
| REACTION-TANK WATER EXCHANGE | OPERATION ○ | OPERATION × | OPERATION ○ | |
| OPERATION MODE 1 | OPERATION ○ | OPERATION ○ | OPERATION ○ | |
| OPERATION MODE 2 | OPERATION ○ | OPERATION × | OPERATION ○ | 613 |
| OPERATION MODE 3 | OPERATION × | OPERATION ○ | OPERATION ○ | |

※ OPERATION ○ : NECESSARY TO OPERATE    OPERATION × : UNNECESSARY TO OPERATE

[FIG. 9]
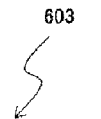
※ ○ : OK   × : NG
[FIG. 10]
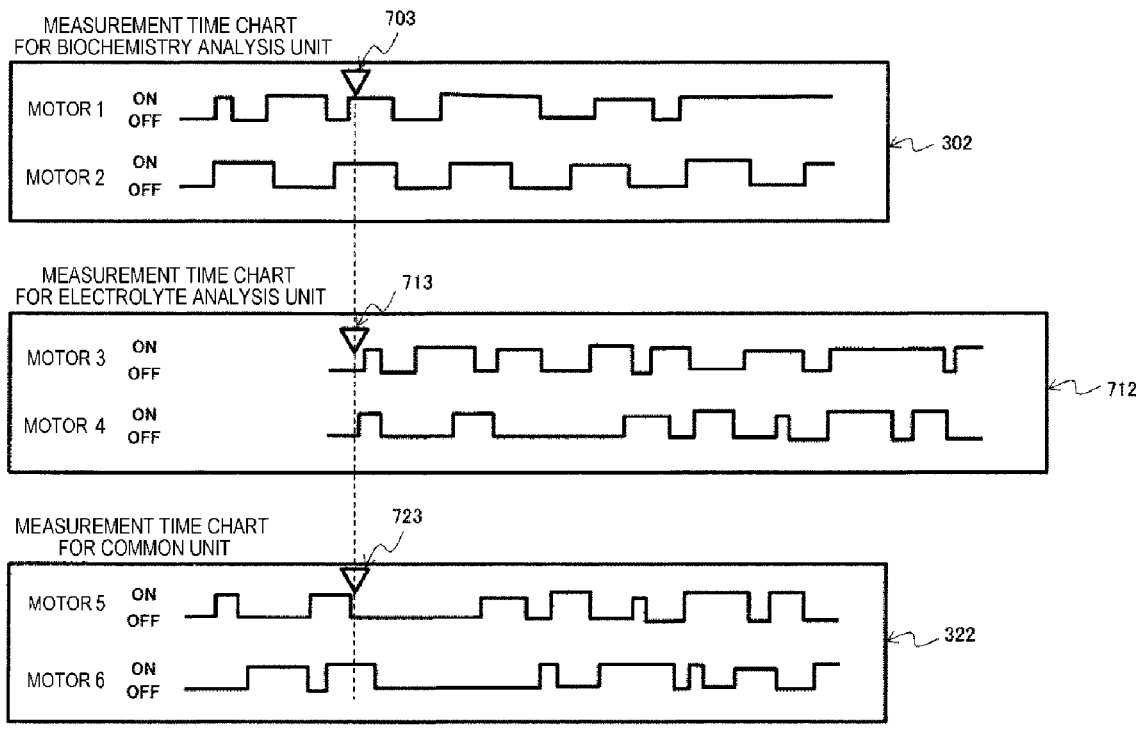

AUTOMATIC ANALYSIS DEVICE AND AUTOMATIC ANALYSIS SYSTEM

TECHNICAL FIELD

The present invention relates to an automatic analysis device that automatically analyzes a concentration of a predetermined component in a biological sample and an automatic analysis system including the automatic analysis device, and particularly relates to an automatic analysis device that controls two or more analysis units by one control part and an automatic analysis system including the automatic analysis device.

BACKGROUND ART

As an automatic analysis device capable of saving labor for maintaining a supply pump supplying a sample to a sample vessel, PTL 1 discloses an automatic analysis device including: a supply pump supplying a calibration sample to a sample vessel; a sucking pump sucking the calibration sample supplied into the sample vessel to an ion sensor unit; a detection part detecting the calibration sample when the supplied calibration sample is a first liquid volume or more; and an analysis control part measuring a time after the calibration sample is sucked by the sucking pump until the calibration sample supplied into the sample vessel by the supply pump is detected by the detection part, in which the analysis control part controls a supply motion rate of the supply pump to set the measured supply time within a prescribed normal range based on information of the supply time.

CITATION LIST

Patent Literature

PTL 1: JP-A-2008-051620

SUMMARY OF INVENTION

Technical Problem

An automatic analysis device is provided with a biochemistry analysis unit that causes biological samples such as blood and urine to react with reagents by irradiating them with light, and analyzes a plurality of items based on detected light, an analysis unit for electrolyte and the like (hereinafter, referred to as electrolyte analysis unit) that measures concentrations of specific electrolyte components such as Cl, Na, and K contained in these biological samples by using an ion selection electrode, and the like.

The electrolyte analysis unit requires a space for analysis smaller than other analysis units. For this reason, in some small automatic analysis devices and the like, both the biochemistry analysis unit and the electrolyte analysis unit are controlled by using a same control central processing unit (CPU).

PTL 1 describes a configuration of an automatic analysis device in which a biochemistry analysis unit and an electrolyte analysis unit are controlled by a same control CPU.

As described above, as compared with a device equipped with an individual control CPU, sharing the control CPU for a plurality of analysis units has advantages of reducing manufacturing costs and power saving.

However, in the automatic analysis device disclosed in PTL 1, when, for example, maintenance such as replacing consumables such as reagents is performed in one analysis unit, it is necessary to stop operations of the entire device including the other analysis units.

That is, among the analysis units controlled by the same control CPU, the operation is controlled in the unit of control CPU, such that analysis operation for one means analysis operation for all and maintenance operation for one means maintenance operation for all.

In addition, since operations are determined in the unit of operation mechanisms smaller than the analysis unit, for example, a reagent dispensing probe, it is complicated to manage which mechanism is to be operated and which mechanism is to be stopped.

As a result, different operations, such as performing the analysis operation in one analysis unit and meanwhile performing the maintenance operation such as replacement of the consumables in another analysis unit, cannot be performed simultaneously. Therefore, there is a problem that for the maintenance operation of one analysis unit, it is necessary to stop the analysis operation of the other analysis units, and there is room for further improvement in analysis efficiency.

The invention provides an automatic analysis device and an automatic analysis system capable of executing separate operations by respective analysis units even in a device configuration where a same control part controls two or more analysis units.

Solution to Problem

The invention includes a plurality of means for solving the problems, and an example thereof is an automatic analysis device for performing an analysis of a sample, the device includes: two or more analysis units for performing the analysis of the sample; one control part for controlling operations of the two or more analysis units; and a storage part for storing time charts of operations having different purposes for respective analysis units, in which the two or more analysis units are operated independently to each other by control of the control part based on the time charts stored in the storage part, and a synchronization point where synchronization is made between each time chart, the point being a timing when an operation is started in other time charts, is provided in the time charts.

Advantageous Effect

According to the invention, separate operations can be executed by respective analysis units even in a device configuration where a same control part controls two or more analysis units. Problems, configurations, and effects other than those described above will be further clarified with the following description of embodiments.

BRIEF DESCRIPTION OF DRAWINGS

FIG. 1 is a view schematically illustrating an entire configuration of an automatic analysis system of embodiment 1 of the invention.

FIG. 2 is a view illustrating a classification of each analysis unit of the automatic analysis system of embodiment 1.

FIG. 3 is a view illustrating one example of a measurement time chart and a stopping point of a biochemistry analysis unit in the automatic analysis system of embodiment 1.

FIG. 4 is a view illustrating one example of a measurement time chart and a stopping point of an electrolyte analysis unit in the automatic analysis system of embodiment 1.

FIG. 5 is a view illustrating one example of a measurement time chart and a stopping point of a common unit in the automatic analysis system of embodiment 1.

FIG. 6 is a view illustrating one example of a reagent prime time chart and a stopping point of the electrolyte analysis unit in the automatic analysis system of embodiment 1.

FIG. 7 is a view for explaining operational states of each appliance of the electrolyte analysis unit before and after arriving at a stopping point in the automatic analysis system of embodiment 1.

FIG. 8 is a view illustrating one example of a table about capability of a simultaneous operation in the automatic analysis system of embodiment 1.

FIG. 9 is a view illustrating one example of a table for deciding capability of a simultaneous operation in the automatic analysis system of embodiment 1.

FIG. 10 is a view illustrating an example of a time chart when each analysis unit returns to an analysis operation and one example of an operation starting point and a synchronizable point with other analysis units according to an automatic analysis system of embodiment 2 of the invention.

DESCRIPTION OF EMBODIMENTS

Hereinafter, embodiments of an automatic analysis device and an automatic analysis system of the invention will be described with reference to the drawings.

Embodiment 1

Embodiment 1 of the automatic analysis device and the automatic analysis system of the invention will be described with reference to FIGS. 1 to 9.

First, an entire configuration of the automatic analysis system according to the present embodiment 1 will be described with reference to FIG. 1. FIG. 1 is a view schematically illustrating the entire configuration of the automatic analysis system according to embodiment 1 of the invention.

The automatic analysis system (100) in FIG. 1 includes a conveyance unit (101), an analysis unit (111), and an operation unit (130).

The conveyance unit (101) is a unit for putting a specimen rack (104), on which one or more sample vessels containing biological samples such as blood and urine to be analyzed are mounted, into the automatic analysis system (100), collecting the specimen rack, conveying the specimen rack into the automatic analysis system (100), and supplying the sample into the analysis unit (111).

The conveyance unit (101) includes a rack buffer (103), a rack supply tray (102), a rack storage tray (107), a conveyance line (106), and a conveyance unit control CPU (105).

In the conveyance unit (101), the specimen rack (104) disposed in the rack supply tray (102) is conveyed to the rack buffer (103) by the conveyance line (106). A sample presence/absence decision sensor (not shown) is provided in a middle of the conveyance line (106), and recognizes presence/absence of the sample vessel on the specimen rack (104). Here, when it is determined that the sample vessel is present, a sample barcode (not shown) attached to the sample vessel is read by a sample barcode reader (not shown) to recognize sample identification information. In a real system, a patient is identified by the identification information.

The rack buffer (103) has a rotor structure that performs circular motion, and has an outer circumference provided with slots for radially holding a plurality of specimen racks (104) on which of each a plurality of sample vessels are placed on concentric circles. By rotating the slots with a motor, any specimen rack (104) can be conveyed into and out from a requested destination. With such a configuration, it is not always necessary to process the specimen racks (104) placed earlier in order. In other words, when a specimen rack has a high priority, the specimen rack can be processed first.

The conveyance line (106) is connected to a certain point on a radial circumference of the rack buffer (103), so that the specimen rack (104) is carried in and out. When this point is at a position of 0 degrees on the circumference, a sample dispensation line (112) for drawing the specimen rack (104) into the analysis unit (111) described later is connected to a position of 90 degrees on the circumference from the position to which the conveyance line (106) is connected, so that the specimen rack (104) is carried in and out.

The specimen rack (104) whose dispensation into the analysis unit (111) is completed waits for output of a measurement result in the rack buffer (103), and can be subjected to processing such as automatic retesting if necessary. Further, when the processing is completed, the specimen rack (104) is conveyed to the rack storage tray (107) via the conveyance line (106).

The conveyance unit control CPU (105) is a unit that executes control of an operation of conveying the appropriate specimen rack (104) from the rack buffer (103) to the sample dispensation line (112) based on a conveying request signal from an analysis unit control CPU (120) of the analysis unit (111), which will be described later, and an operation of returning the specimen rack (104) from the sample dispensation line (112) to the rack buffer (103). The conveyance unit control CPU (105) controls a conveying operation for conveying the sample to the analysis unit (111).

The analysis unit (111) performs measurement operations of measurement items requested for the sample and outputs the measurement results. The analysis unit (111) is connected to the conveyance unit (101).

The analysis unit (111) includes a reaction disc (115), a reagent disc (117), the sample dispensation line (112), a reagent dispensation probe (116), a sample dispensation probe (113), a biochemical measurement part (118), an electrolyte measurement part (114), and the analysis unit control CPU (120).

Reaction vessels (not shown) are arranged on a circumference of the reaction disk (115). The sample dispensing line (112) into which the specimen rack (104) mounted with the sample vessel is carried is disposed near the reaction disk (115).

The sample dispensation probe (113) that can rotate and move up and down is disposed between the reaction disc (115) and the sample dispensation line (112). The sample dispensation probe (113) moves while drawing an arc around a rotation axis to dispense the sample from the specimen rack (104) to the reaction vessel.

The reagent disc (117) is a cabinet on whose circumference a plurality of reagent bottles (not shown) containing a reagent can be placed. The reagent disc (117) is kept cold.

The reagent dispensation probe (116) that can rotate and move up and down is disposed between the reaction disc (115) and the reagent disc (117). The reagent dispensation probe (116) moves while drawing an arc around a rotation axis, so as to access an inside of the reagent disc (117) from a reagent dispensation probe suction port, and to dispense the reagent from the reagent bottles to the reaction vessels.

Further, washing tanks (not shown) are respectively disposed within operation ranges of the reagent dispensation probe (116) and the sample dispensation probe (113).

The electrolyte measurement part (114) and the biochemical measurement part (118) are further disposed around the reaction disc (115).

The electrolyte measurement part (114) is an analysis part that measures an electrolyte concentration in the sample by using an ion selection electrode. A reagent bottle (119) necessary for measurement is connected to the electrolyte measurement part (114) by a tube (not shown) separately from the reagent disc (117), and the reagent is delivered to the electrolyte measurement part (114) through a flow path of this tube.

The biochemical measurement part (118) is an analysis part that analyzes biochemical components in the sample by measuring an absorbance of a reaction solution produced by mixing and reacting in the reaction vessels on the reaction disc (115). The biochemical measurement part (118) includes a light source, a spectrophotometer, and the like.

The analysis unit control CPU (120) disposed in the analysis unit (111) is connected to each appliance in the above analysis unit (111), and controls operations of the appliance.

In particular, in the analysis unit control CPU (120) of the present embodiment, the biochemistry analysis unit (201) and the electrolyte analysis unit (211) (for both, see FIG. 2) are operated independently to each other. The details of these operations will be described in detail later with reference to FIG. 2 and later.

Returning to FIG. 1, the operation unit (130) is a part that manages information of all the units of the entire automatic analysis system (100), and includes a display part (131), an input part (132), a storage part (133), and an entire control part (134). The operation unit (130) is connected to the analysis unit (111) and the conveyance unit (101) by a wired or wireless network line.

The display part (131) is a part on which various screens such as an operation screen for ordering measurement items to be measured for a sample to be measured, a screen for confirming a measurement result, and the like are displayed, and is configured with a liquid crystal display or the like.

The input part (132) is a part for inputting various parameters and settings, measurement results, measurement request information, analysis start/stop instructions, and the like based on the operation screen displayed on the display part (131), and is configured with a keyboard, a mouse, or the like.

The storage part (133) is a part that stores a time chart and operation parameters necessary for operations in the automatic analysis system (100), and various information related to biological samples, and is configured with a storage medium such as a semiconductor memory such as a flash memory or a magnetic disk such as an HDD. Details of the time chart stored in the storage part (133) will be described later.

Next, mechanical operations of the automatic analysis system (100) shown in FIG. 1 will be schematically described.

The conveyance unit (101) sends the specimen racks (104) disposed in the rack supply tray (102) of the automatic analysis system (100) one by one onto the conveyance line (106), and carries the specimen racks (104) into the rack buffer (103). The specimen racks (104) conveyed to the rack buffer (103) are conveyed to the sample dispensation line (112) of the analysis unit (111).

When the specimen rack (104) arrives at the sample dispensation line (112), a dispensing operation is performed on each sample mounted on the specimen rack (104) by the sample dispensation probe (113) according to the measurement items requested by the operation unit (130).

When the measurement item is a biochemical item, the sample dispensation probe (113) discharges the sucked sample into the reaction vessel on the reaction disc (115), the reagent sucked from the reagent disc (117) by the reagent dispensation probe (116) is further added to the reaction vessel, followed by stirring. Thereafter, the absorbance is measured by the biochemical measurement part (118), and a measurement result is transmitted to the operation unit (130).

When the requested measurement item is an electrolyte item, the sample dispensation probe (113) discharges the sucked sample into the electrolyte measurement part (114), an electromotive force is measured by the electrolyte measurement part (114), and a measurement result is transmitted to the operation unit (130). However, in the case where the electrolyte item is measured, as will be described later, a pre-measurement operation is required to measure an electromotive force of an internal standard solution at a known concentration before dispensing the sample.

The operation unit (130) obtains a concentration of a specific component in the sample by arithmetic processing based on the transmitted measurement result.

Among the series of operations described above, the conveying operation of the conveyance unit (101) is controlled by the conveyance unit control CPU (105), and analysis operations of the analysis unit (111) are controlled by the analysis unit control CPU (120).

Next, details of controlling the operation of each appliance in the analysis unit (111) will be described with reference to FIG. 2 and the subsequent drawings. FIG. 2 shows a classification of each part in the analysis unit (111) of the present embodiment and an outline of time charts in each analysis unit.

As shown in FIG. 2, the analysis unit (111) of the automatic analysis system (100) according to the present embodiment is mainly classified into three types including a biochemistry analysis unit (201), an electrolyte analysis unit (211), and a common unit (221).

The biochemistry analysis unit (201) is configured with a mechanism necessary only for biochemical analysis that includes the reaction disc (115), the reagent dispensation probe (116), and the biochemical measurement part (118).

The electrolyte analysis unit (211) is configured with a mechanism necessary only for electrolyte analysis that includes the electrolyte measurement part (114), the tube, and the reagent bottle (119) connected to the electrolyte measurement part (114) by the tube.

The common unit (221) is configured with a mechanism that executes a sample feeding operation necessary for both the biochemical and electrolyte analysis and includes the sample dispensation probe (113) and the sample dispensation line (112).

These biochemistry analysis unit (201), electrolyte analysis unit (211), and common unit (221) are operated independently to each other based on the time charts stored in the storage part (133) of the operation unit (130).

For this purpose, time charts (302, 312, 314, 322) are used (see FIGS. 3 to 6). In the time charts, conditions for the motor that drives each component in each unit, such as when to start the operation and how long to operate, are set for each component.

In the present embodiment, the time charts include three types that match the classification of the above three units, including a measurement time chart (302) as shown in FIG. 3 for the biochemistry analysis unit (201), a measurement time chart (312) as shown in FIG. 4 for the electrolyte analysis unit (211), and a measurement time chart (322) as shown in FIG. 5 for the common unit (221).

As shown in FIGS. 3 to 5, each analysis unit uses the measurement time chart (302, 312, 322) among the stored time charts to perform the measurement. When each analysis unit operates to an end of the measurement time chart (302, 312, 322), the unit returns to a start of the time chart and operates repeatedly.

FIG. 3 is one example of a measurement time chart and a stopping point of the biochemistry analysis unit, FIG. 4 is one example of a measurement time chart and a stopping point of the electrolyte analysis unit, and FIG. 5 is one example of a measurement time chart and a stopping point of the common unit.

The components within each unit operate based on these time charts created for corresponding motors. For example, in a case of the biochemistry analysis unit (201), the operation is performed in the unit of the reaction disc (115) and the reagent dispensation probe (116).

In addition, the time chart is individually set for each operation mode having a different purpose in each unit. For example, when the electrolyte analysis unit (211) is taken as an example, the measurement time chart (312) as shown in FIG. 4 and a reagent prime time chart (314) as shown in FIG. 6 for, for example, maintenance, are set individually. Reagent prime refers to an operation for filling a reagent flow path from the reagent bottle (119) to the electrolyte analysis unit (211) with a new reagent.

FIG. 6 is a view illustrating one example of the reagent prime time chart and a stopping point of the electrolyte analysis unit.

The set time charts (302, 312, 314, 322) of operations for different purposes for each of the biochemistry analysis unit (201), the electrolyte analysis unit (211), and the common unit (221) are stored in the storage part (133) of the operation unit (130). Then, when the automatic analysis system (100) is started, the automatic analysis system reads the time charts from the storage part (133) of the operation unit (130) into a memory of the analysis unit control CPU (120), and stores the time chart in the memory (not shown) or the like.

The time charts when all the units in the analysis unit (111) perform measurement or maintenance are described above.

Here, during the measurement performed by the automatic analysis system (100), the measurement operations may not be able to be continued when consumables such as reagents for electrolytes are exhausted, or when a failure or trouble of the operating mechanism occurs.

In this case, if it is possible to stop any one of the biochemistry analysis unit (201) and the electrolyte analysis unit (211) with the other unit and the common unit (221) continuing the measurement, analysis efficiency can be further improved.

For example, it is desirable that when only the reagent for electrolyte analysis is exhausted, a user interrupts only the analysis of the electrolyte analysis unit (211) to replace the reagent bottle (119). In this case, the user specifies the electrolyte analysis unit (211) via the input part (132) of the operation unit (130) or a touch panel of the display part (131), so as to issue a stop instruction to stop only the electrolyte analysis unit (211).

In the case where a failure or trouble of the operating mechanism occurs, the automatic analysis system (100) itself stops an operation of a target analysis unit.

A unit to be stopped by the stop instructions can be not only the electrolyte analysis unit (211) but also the biochemistry analysis unit (201) and the common unit (221).

In order to implement such a stop, as shown in FIGS. 3 to 6, each of the time charts (302, 312, 314, 322) is provided with at least one stopping point (303a, 313a, 313b, 323a, 315a, 315b) which is a timing for stopping an operation of an appliance in a target unit.

It is desirable that each stopping point (303a, 313a, 313b, 323a, 315a, 315b) is a timing at which each of the appliances operating in the analysis unit (111) does not physically interfere with each other, and is set in consideration of, for example, a place where even when a corresponding unit is stopped, a load is not applied to each appliance, such as a place where the operations of the other units in operation are not affected, and a place where the appliances are not in contact with each other.

Further, it is desirable to set each stopping point (303a, 313a, 313b, 323a, 315a, 315b) to a timing when all the operating appliances in the target unit are OFF.

Further, as shown in FIGS. 4 and 6, two or more stopping points can be provided in one time chart.

For example, as shown in the measurement time chart (312) of the electrolyte analysis unit in FIG. 4, the stopping points (313a, 313b) are set in consideration of the place where the other units are not affected and the like. Further, as shown in FIG. 6, two stopping points (315a, 315b) are set in the reagent prime time chart (314) as well.

When the electrolyte analysis unit (211) is instructed to stop, the electrolyte analysis unit (211) stops at a first arriving stopping point of the measurement time chart (312) of the operating electrolyte analysis unit. As a result, extra operations can be prevented from being executed, and consumption of the consumables such as the reagents can be reduced.

For example, in FIG. 7, when a stop instruction is issued at a stop instruction timing (521), an operation of the measurement time chart (312) of the electrolyte analysis unit is stopped and the operation of the electrolyte analysis unit (211) itself is stopped at the first arriving stopping point (313d) after the stop instruction timing (521) instead of being stopped at the stopping point (313c) before the stop instruction timing (521). As shown in FIG. 7, in reality, each motor is OFF and the operation of the motor is stopped when reaching the stopping point (313d).

FIG. 7 is a view for explaining operational states of each appliance of the electrolyte analysis unit before and after arriving at a stopping point.

Further, it is desirable that when the time chart ends without a stopping point present after the stop instruction timing (521), the time chart is ended and stopped without repeating.

At this time, since only the electrolyte analysis unit (211) is stopped, the operating biochemistry analysis unit (201) or the common unit (221) are not affected, so that the biochemical analysis can be continued by using the biochemistry analysis unit (201) and the common unit (221).

After the electrolyte analysis unit (211) is stopped, the user takes necessary steps to start the analysis. For example, when the reagent for electrolyte analysis is insufficient, the reagent bottle (119) of the electrolyte is replaced with a new one, and the user replaces the reagent bottle (119). Thereafter, necessary maintenance is executed.

The necessary maintenance includes, for example, maintenance of the reagent prime for filling the reagent flow path from the reagent bottle (119) to the electrolyte analysis unit (211) with the new reagent. The reagent prime only needs to fill the reagent flow path with the reagent, and measurement is not necessary. Therefore, as described above, the dedicated time chart (314) specialized for the reagent prime, such as sucking more reagents than that of the measurement time chart, is prepared.

Based on that, the analysis unit control CPU (120) operates the electrolyte analysis unit (211) according to the reagent prime time chart (314). Meanwhile, the analysis unit control CPU (120) operates the biochemistry analysis unit (201) and the common unit (221) to continue the measurement operation as they are with reference to the measurement time chart (302, 322). As a result, the electrolyte analysis unit (211) can continue the analysis of the sample while performing the reagent prime.

In addition, during the measurement performed by the automatic analysis system (100), there is a timing for performing maintenance that cannot be performed by the electrolyte analysis unit (211) alone and requires using of the biochemistry analysis unit (201) and the common unit (221) as well, such as a reset operation.

In order to confirm whether or not such maintenance using a plurality of units can be operated, it is desirable to determine capability of the operation. Hereinafter, a configuration necessary for the determination and details of the processing will be described with reference to FIGS. 8 and 9. FIG. 8 is a view illustrating one example of a table about capability of a simultaneous operation, and FIG. 9 is a view illustrating one example of a table for deciding capability of a simultaneous operation.

In order to determine different operations that can be executed simultaneously between the biochemistry analysis unit (201), the electrolyte analysis unit (211), and the common unit (221), a simultaneous operation capability table (601) as shown in FIG. 8 and a simultaneous operation capability decision table (603) as shown in FIG. 9 are stored in the storage part (133) of the operation unit (130).

For example, as shown in FIG. 8, the simultaneous operation capability table (601) summarizes whether or not an operation of each analysis unit is necessary for each operation item to be executed.

For example, a case where the Reset operation is executed during an operation in operation mode 2 is considered. In this case, confirming a table for deciding Reset operation (611) in the simultaneous operation capability table (601), it can be seen that the biochemistry analysis unit (201), the electrolyte analysis unit (211), and the common unit (221) are all required to operate. Based on this, it can be seen that the Reset operation cannot be performed when any of the units performs another operation.

For example, a case where a reagent prime operation of the reagent for electrolyte analysis is performed during the operation in operation mode 2 is considered. Also in this case, similarly confirming a table for deciding reagent prime operation (612) in the simultaneous operation capability table (601), it can be seen that the biochemistry analysis unit (201) and the common unit (221) are not required to operate, and only the electrolyte analysis unit (211) is required to operate. Based on this, it can be seen that the reagent prime operation of the electrolyte analysis unit (211) can be performed independently and simultaneously with the other analysis units.

In other words, it can be said that in a case where the automatic analysis system (100) operates in operation mode 2, confirming a table for deciding operation mode 2 (613), since the electrolyte analysis unit (211) does not operate, it can be determined that the reagent prime operation can be executed simultaneously.

The simultaneous operation capability decision table (603) shown in FIG. 9 summarizes these relationships.

As shown in FIG. 9, it can be seen that when the operation to be executed is the Reset operation or operation mode 1, the operation basically cannot be performed in parallel with the other operations among operations concretely illustrated in FIGS. 8 and 9. In addition, it can be seen that in a case where the operation to be executed is a Cell Blank operation, the operation can be executed in parallel with the reagent prime and operation mode 3.

When various operation items are executed, the analysis unit control CPU (120) acquires the simultaneous operation capability decision table (603) and the simultaneous operation capability table (601) related to whether or not the operation of each analysis unit is necessary from the storage part (133) of the operation unit (130). Thereafter, for the operation items to be executed, it is determined whether or not each analysis unit can operate simultaneously based on the information summarized in the acquired table, and a necessary time chart is acquired from the storage part (133) and executed as appropriate.

When it is determined that each analysis unit cannot operate simultaneously, by referring to a time chart of an interfering unit, it is possible to stop when a stopping point is first arrived and transit to a necessary operation. The case is not limited to the case where the operation is stopped when the stopping point is first reached, and the operation may standby until an end of the time chart currently in operation.

When the maintenance is performed on the analysis unit (111) as a whole, the maintenance is performed by operating each unit according to a required maintenance time chart.

Next, effects of the present embodiment will be described.

The automatic analysis system (100) of the above present embodiment includes: the biochemistry analysis unit (201) and the electrolyte analysis unit (211) that perform analysis on the sample; one analysis unit control CPU (120) that controls the operations of the biochemistry analysis unit (201) and the electrolyte analysis unit (211); and the storage unit (133) that stores the time charts (302, 312, 314, 322) having different purposes for each of the biochemistry analysis unit (201) and the electrolyte analysis unit (211). The two or more biochemistry analysis unit (201) and electrolyte analysis unit (211) are operated independently to each other based on the time charts (302, 312, 314, 322) stored in the storage part (133).

As a result, in the analysis unit (111) in which the operations of the biochemistry analysis unit (201) and the electrolyte analysis unit (211) are controlled by one analysis unit control CPU (120), different operations, such as one performing the analysis operation and another performing the maintenance operation such as replacement of the consumables, can be performed simultaneously. As a result, throughput of the one analysis unit that continues the analysis is not reduced, which can improve analysis processing performance.

Since the storage part (133) stores the simultaneous operation capability table (601) or the simultaneous operation capability decision table (603) for determining the operation simultaneously executable between the biochemistry analysis unit (201) and the electrolyte analysis unit (211), which are different from each other, upon transition to an operation for a different purpose, it is possible to determine in advance whether or not the transition causes a defect such as interference of each appliance in the automatic analysis system (100) or the analysis unit (111). Therefore, occurrence of problems such as failures in the automatic analysis system (100) and the analysis unit (111) can be prevented, and the analysis processing performance can be further improved.

Furthermore, for effect of operating independently according to the time chart having different purposes for each of the analysis units, one common unit (221) for supplying the sample to the two or more biochemistry analysis unit (201) and electrolyte analysis unit (211) is further provided, the storage part (133) stores the time chart (322) of operations having different purposes for the common unit (221).

The stopping points (303a, 313a, 313b, 323a, 315a, 315b) that are timings of stopping the operations of the appliances in the target unit are provided in the time charts (302, 312, 314, 322), so that the operations of the target unit can be stopped without waiting for the end of the series of time charts, and it is possible to quickly transit to a next operation. Therefore, the analysis processing performance can be further improved.

Two or more of the stopping points (303a, 313a, 313b, 323a, 315a, 315b) determined in the time charts (302, 312, 314, 322) are provided in each time chart (302, 312, 314, 322), so that it is possible to secure more timings to stop, and to accelerate the transition to the required operation.

The stopping points (303a, 313a, 313b, 323a, 315a, 315b) are set as timings when each appliance operating in the analysis unit (111) does not physically interfere with each other, so that even only the corresponding unit is stopped, the operation of the other units in operation can be continued, and the operation can be continued more stably.

The stopping points (303a, 313a, 313b, 323a, 315a, 315b) are set as timings when all operating appliances in the target unit are OFF, so that the appliances in the target unit can be prevented from stopping unexpectedly when the appliances are moving, and the load on the appliance to be stopped can be reduced.

In the present embodiment, the analysis unit (111) of FIG. 1 is described as an example of a device that integrates the biochemical measurement part (118) for measuring biochemical items and the electrolyte measurement part (114) for measuring electrolyte items into one analysis unit (111). However, the invention is not particularly limited to such a configuration, and can be applied to a measurement unit that measures any measurement item as long as the measurement unit is an analysis unit in which two or more measurement units that can operate independently are disposed. For example, the invention is also effective when two or more biochemical measurement parts (118) are provided in the analysis unit (111).

Further, the configuration in which the analysis unit (111) is connected only to one side of the rack buffer (103) is described, but the automatic analysis system (100) shown in FIG. 1 is only an example. For example, another analysis unit (for example, an analysis device equivalent to the analysis unit (111), an immunoassay, or the like) can be connected to the other side of the rack buffer (103) of the automatic analysis system (100) shown in FIG. 1.

Further, the invention can be applied to an automatic analysis device configured with the analysis unit (111) and the operation unit (130) while omitting the conveyance unit (101).

Embodiment 2

An automatic analysis device and an automatic analysis system according to embodiment 2 of the invention will be described with reference to FIG. 10. The same components as in embodiment 1 are denoted by the same reference numerals, and the description thereof is omitted. The same applies to the following embodiments.

In addition to the automatic analysis system (100) of embodiment 1, the automatic analysis system of the present embodiment includes a configuration for each analysis unit to return to the analysis operation after the reagent replacement and the maintenance required for the analysis operation are completed. Hereinafter, a configuration thereof will be described in detail with reference to FIG. 10. FIG. 10 is a view illustrating an example of a time chart when each analysis unit returns to an analysis operation and one example of an operation starting point and a synchronizable point with other analysis units.

As described above, after the reagent replacement and the maintenance required for the analysis operation are completed, the user releases the stop instruction of the electrolyte analysis unit (211) via the input part (132) of the operation unit (130), so that the electrolyte analysis unit (211) can be returned to the analysis operation.

However, the case where the electrolyte analysis unit (211) is returned to the analysis operation is simply considered without considering operating conditions of the biochemistry analysis unit (201) and the common unit (221).

In this case, since synchronization of operations with the biochemistry analysis unit (201) and the common unit (221) is not taken into consideration, each appliance may collide depending on the timing.

Further, in the electrolyte analysis unit (211), it is necessary to measure the electromotive force of the internal standard solution before analyzing an electrolyte of the sample dispensed by the common unit (221).

However, when the electrolyte analysis unit (211) and the common unit (221) are not synchronized, there is a risk that after the common unit (221) dispenses the sample into the electrolyte analysis unit (211), the electrolyte analysis unit (211) may measure an electromotive force of an internal standard solution mixed with the dispensed sample. Further, in this case, the electrolyte analysis unit (211) executes a sample measurement operation without the sample.

Therefore, both the necessary pre-measurement and the main measurement become inaccurate, and the normal measurement results cannot be output.

Such synchronization can be prevented by stopping the time charts for operating the biochemistry analysis unit (201) and the common unit (221) at the end without repeating, and restarting the time charts at the same time for all units. This is an effective method in the above-described embodiment. However, this leaves room for reducing a time from the end to the restart of the time chart, and there is room for further improvement of the analysis processing performance.

In the present embodiment, in order to further improve such analysis processing performance, as shown in FIG. 10, synchronizable points (703, 723), which are timings at which another time chart (712) can start operation, are provided to the measurement time chart of the biochemistry analysis unit (302) and the measurement time chart of the common unit (322). Similarly, the electrolyte analysis unit measurement time chart (712) is also provided with an operation starting point (713) which is a timing at which the measurement operation of the electrolyte analysis unit (211) is started.

FIG. 10 shows a case where the measurement operation of the electrolyte analysis unit (211) is restarted.

The time charts (302, 322, 712) in which these synchronizable points (703,723) and the operation starting point (713) are set are stored in the storage part (133) of the operation unit (130).

The operation starting point (713) is set at a place where the operation of the stopped electrolyte analysis unit (211) may restart. In addition, the synchronizable point (703, 723) are set on the time charts at positions where even when the electrolyte analysis unit (211) starts the analysis operation from the operation starting point (713) at this timing, the mechanisms do not collide and the analysis is performed in a normal order.

Therefore, it can be said that the synchronizable points (703, 723) respectively serve as operation starting points for the biochemistry analysis unit (201) and the common unit (221), and the operation starting point (713) is a synchronizable point in the electrolyte analysis unit (211).

It is desirable that these synchronizable points (703, 723) and the operation starting point (713) are provided not only in the measurement time chart but also in the other time charts of operations having different purposes.

In FIG. 10, the operation starting point (713) is set as a starting point of the analysis operation of the electrolyte analysis unit (211), but the invention is not limited to this, and the operation start point (713) can be appropriately set at a timing when each appliance operating in the analysis unit (111) does not physically interfere with each other.

The synchronizable point (703) of the biochemistry analysis unit (201) and the synchronizable point (723) of the common unit (221) that are currently in operation are already operating in synchronization. Therefore, the synchronizable point (703) and the synchronizable point (723) are on the same operation timing. When the operation timing of the biochemistry analysis unit (201) and the common unit (221) reaches the synchronizable points (703, 723), even when the electrolyte analysis unit (211) is operated for analysis, the above-mentioned problems that the mechanisms collide and the order of the analysis operations is not normal do not occur.

Therefore, when the operation reaches these synchronizable points (703, 723), the analysis unit control CPU (120) operates the electrolyte analysis unit (211) from the operation starting point (713) of the electrolyte analysis unit measurement time chart (712). As a result, the units can be synchronized with each other, thereby avoiding problems such as the collision of the mechanisms and the incorrect dispensing order, and returning to the analysis operation.

Other configurations and operations are substantially the same as the automatic analysis device and the automatic analysis system in embodiment 1, and details thereof are omitted.

The automatic analysis device and the automatic analysis system according to embodiment 2 of the invention also have almost the same effects as the automatic analysis device and the automatic analysis system according to embodiment 1.

The synchronizable points (703, 723) at which the time charts (302, 322, 712) are synchronized and the other time chart (712) starts the operation are provided in the time charts (302, 322, 712). As a result, for example, when the analysis unit on which the maintenance is performed is returned to perform the analysis operation, this analysis unit can be synchronized with the analysis units that continue the analysis, so that a risk of a defect such as the collision of the mechanisms such as the dispensing mechanisms between the analysis units can be prevented. That is, it is not necessary to stop the other analysis units that continue the analysis when returning to the continuing operation, so that the analysis performance can be further improved.

The synchronizable points (703, 723) and the operation starting point (713) can be set at a timing when each appliance operating in the analysis unit (111) does not physically interfere with each other, so that the collision of the mechanisms or the like between the analysis units can be avoided, and the analysis processing performance can be further improved.

The synchronizable points and the operation starting point can be appropriate used only not in the case where the analysis unit on which the maintenance is performed is returned to perform the analysis operation, but also in a case where a certain unit transits to an operation having a different purpose, that is, a case where a certain unit transits to a time chart of an operation having a different purpose.

The state where the certain unit transits to the operation having a different purpose means transiting from a state where the unit is operated without interfering with each appliance of the other units to a state where the interference may occur.

In such a case, it is also considered to stop the currently operating time chart at the end without repeating the operation and restart the time chart at the same time for all the units. However, since the waiting time occurs as described above, there is still room for improvement in the processing performance.

Then, by using the synchronizable points and the operation starting point as well when the certain unit transits to the operation having a different purpose, the interference of each appliance in the system can be avoided, and meanwhile, it is possible to quickly transit to the desired operation required for each unit. Therefore, the analysis processing performance can be improved to the maximum.

Other Embodiments

The invention is not limited to the above embodiment, and various modifications and applications can be made thereto. For example, the above-described embodiment has been described in detail in order to make the invention easy to understand, and the invention is not necessarily limited to those which have all the configurations described.

REFERENCE SIGNS LIST

100: automatic analysis system
101: conveyance unit (conveyance device)
102: rack supply tray
103: rack buffer
104: specimen rack
105: conveyance unit control CPU
106: conveyance line
107: rack storage tray
111: analysis unit
112: sample dispensation line
113: sample dispensation probe
114: electrolyte measurement part
115: reaction disc
116: reagent dispensation probe
117: reagent disc
118: biochemical measurement part 119: reagent bottle
120: analysis unit control CPU (control part)
130: operation unit
131: display part
132: input part
133: storage part
134: entire control part
201: biochemistry analysis unit
211: electrolyte analysis unit
221: common unit
302: measurement time chart of biochemistry analysis unit
303a, 313a, 313b, 315a, 315b, 323a: stopping point
312: measurement time chart of electrolyte analysis unit
314: reagent prime time chart of electrolyte analysis unit
322: measurement time chart of common unit
521: stop instruction timing
601: simultaneous operation capability table (decision table)
603: simultaneous operation capability decision table (decision table)
611: table for deciding Reset operation
612: table for deciding reagent prime operation
613: table for deciding operation mode 2
703: biochemistry analysis unit measurement operation synchronizable point (synchronization point)
712: measurement time chart when electrolyte analysis unit returns to measurement
713: operation starting point (synchronization point)
723: common unit measurement operation synchronizable point (synchronization point)

The invention claimed is:

1. An automatic analysis device for performing an analysis of a sample, the device comprising:
two or more analysis units each comprising at least one appliance for performing the analysis of the sample;
a Central Processing Unit (CPU) configured to control operations of the two or more analysis units; and
a semiconductor or magnetic disk memory configured to store a plurality of time charts each specifying a timing of motor components for performing different operations for each of said two or more analysis units such that each time chart controls a single analysis unit, wherein
the two or more analysis units are operated independently to each other by control of the CPU based on the time charts stored in the semiconductor or magnetic disk memory,
each said time chart comprises a synchronization point defining a timing synchronization among said plurality of time charts, the synchronization point being set as a timing when each appliance operating in the automatic analysis device does not physically interfere with each other, and
the CPU is further configured to control an operation being started to be executed in the corresponding at least one appliance of at least one of the two or more analysis units in accordance with an ON/OFF timing specified by its respective time chart beginning at the synchronization point.

2. The automatic analysis device according to claim 1, wherein
the semiconductor or magnetic disk memory stores a decision table for determining a plurality of operations which are simultaneously executable by the CPU for multiple respective different analysis units of the two or more analysis units.

3. The automatic analysis device according to claim 1, further comprising:
a common sample dispensation probe and sample dispensation line configured to supply the sample to the two or more analysis units, wherein
the semiconductor or disk memory stores time charts of operations having different purposes for the common sample dispensation probe and sample dispensation line.

4. The automatic analysis device according to claim 1, wherein
at least one stopping point that is a timing of stopping an operation of an appliance in a target unit of the two or more analysis units is provided in one or more of said plurality of time charts.

5. The automatic analysis device according to claim 4, wherein
two or more of the stopping points are provided in one or more of said plurality of time charts.

6. The automatic analysis device according to claim 4, wherein
the stopping point is set as a timing when each appliance operating in the automatic analysis device does not physically interfere with each other.

7. The automatic analysis device according to claim 4, wherein
the stopping point is set as a timing when all operating appliances in the target unit are OFF.

8. An automatic analysis system comprising:
the automatic analysis device according to claim 1; and
a conveyance device for supplying the sample to the automatic analysis device.

* * * * *